United States Patent [19]
Jang

[11] Patent Number: 5,690,574
[45] Date of Patent: Nov. 25, 1997

[54] HYDRAULIC CONTROL SYSTEM FOR AUTOMATIC TRANSMISSIONS

[75] Inventor: Jaeduk Jang, Kyungki-do, Rep. of Korea

[73] Assignee: Hyundai Motor Company, Rep. of Korea

[21] Appl. No.: 658,806

[22] Filed: Jun. 6, 1996

[30] Foreign Application Priority Data

Aug. 30, 1995 [KR] Rep. of Korea ............... 95-27632

[51] Int. Cl.$^6$ .................................. F16H 61/06
[52] U.S. Cl. ................................... 475/128
[58] Field of Search ................... 475/128, 131; 477/116, 117, 131

[56] References Cited

U.S. PATENT DOCUMENTS

| | | | |
|---|---|---|---|
| 4,616,531 | 10/1986 | Ogasawara et al. | 477/117 |
| 4,724,727 | 2/1988 | Shibayama et al. | 475/128 |
| 4,807,496 | 2/1989 | Hayasaki et al. | 477/117 |
| 4,982,622 | 1/1991 | Yamamoto et al. | 477/117 |
| 5,305,665 | 4/1994 | Sano et al. | 475/128 |
| 5,342,253 | 8/1994 | Mizobe et al. | 475/128 |
| 5,385,511 | 1/1995 | Iizuka | 477/117 |

*Primary Examiner*—Dirk Wright
*Attorney, Agent, or Firm*—Finnegan, Henderson, Farabow, Garrett & Dunner, L.L.P.

[57] ABSTRACT

A pressure regulating portion having a pressure regulating valve regulates hydraulic pressure fed from a hydraulic pump and a shift control part having a manual valve and a shift control valve feeds hydraulic pressure fed from the pressure regulating portion in response to each shift mode. A pressure control portion controls hydraulic pressure to be proper to each shift mode. The pressure control part includes first and second pressure control solenoid valves, and first and second pressure control valves and an N-R control valve. A pressure dispensing part dispenses hydraulic pressure fed from the shift control part and the pressure control part to first, second, third, fourth and fifth friction members. A switch valve feeds selectively hydraulic pressure fed from the second pressure control valve to the first and fourth friction members. A pressure damping member is disposed on a line connected to the third friction member which is applied in third and fourth speeds of a drive "D" range. A first release pressure retarding member is disposed on a release pressure line of the fifth friction member and a second release pressure retarding member is disposed on a line connecting the first pressure control valve to the first-to-second speed shift valve.

8 Claims, 5 Drawing Sheets

HYDRAULIC CONTROL SYSTEM FOR AUTOMATIC TRANSMISSIONS

BACKGROUND OF THE INVENTION

1. Field of the Invention

The present invention relates to a manual shifting hydraulic control system of an automatic transmission for a vehicle. More particularly, the present invention relates to a hydraulic control system which can enhance shift quality by alleviating shock occurring when a shift selector lever is manually shifted between each range mode.

2. Description of the Related Art

Generally, an automatic transmission provides a necessary gear ratio to operate the vehicle under a wide range of speeds and loads. It does this with a minimum amount of effort on the part of the driver. That is, automatic upshifts and downshifts are a convenience for the driver because a foot-operated clutch is eliminated and there is no need to shift the transmission into neutral.

A conventional automatic transmission for a vehicle comprises a torque converter having an impeller, a turbine and a stator, a gear train connected to the torque converter to provide various forward speed ranges and reverse, a plurality of friction members such as disc clutches, one-way clutches which control gear action, and a hydraulic control system for controlling the operation of the friction members.

The hydraulic control system generally includes pressure regulator means for controlling hydraulic pressure, shift control means for feeding hydraulic pressure from the pressure regulator means in response to each shift mode, pressure control means for controlling hydraulic pressure to increase shift quality and responsiveness with respect to gear shifting, damper clutch control means for controlling the operation of a torque converter and damper clutch, and pressure dispenser means for properly feeding and dispensing hydraulic pressure to each friction member in response to each shift mode.

The hydraulic control system further comprises a manual valve having a plurality of ports which varies in accordance with the driver's intention to feed or exhaust hydraulic pressure therethrough.

The ports of the manual valve vary in accordance with the position (range) of a shift select lever having the following usual six positions of park "P", reverse "R", neutral "N", drive "D", second "2", and low "L" ranges.

In the drive "D", second "2", and low "L" ranges, a transmission control unit processes signals transmitted from a throttle valve position sensor, a vehicle speed sensor, a water temperature sensor, and the like and thereby controls shift control solenoid valves, which control the port variation of the shift control valve to an ON/OFF state, thereby accomplishing the automatic gear shift.

However, when the shift selector lever is manually shifted, for example, between the drive "D" range to the neutral "N" range or between the drive "D" range to the reverse "R" range, inherent shift shock occurs.

In this manual range shifting operation, especially from the neutral "N" range to the reverse "R" range, it is profitable to control an input element rather than a reacting element having a large torque variation. It is possible to control only the input element in a state that the power train does not operate, that is, in the neutral "N" range. However, in the operation state of the power train, it is preferable to control both the input and reacting elements.

However, in the related art, one of the elements is applied without any control, the other is applied with control, such that shift shock occurs by the inertia force of the power train.

SUMMARY OF THE INVENTION

Accordingly, the object of the present invention is to provide a hydraulic control system for automatic transmissions, which can alleviate shift shock by controlling both input and reacting elements during the manual range shifting operation, thereby improving the overall shift feeling when shifting.

To achieve the object, the present invention provides a hydraulic control system for an automatic transmission, comprising a pressure regulating means, having a pressure regulating valve, for constantly regulating hydraulic pressure fed from a hydraulic pump and a shift control means, having a manual valve and a shift control valve, for feeding hydraulic pressure fed from the pressure regulating means in response to each shift mode. The system further comprises a pressure control means for controlling hydraulic pressure in the proper amount according to each shift mode. The pressure control means includes first and second pressure control solenoid valves which are duty controlled by a transmission control unit, and first and second pressure control valves and an N-R control valve which are controlled in accordance with the operation of the solenoid valves. A pressure dispensing means dispenses hydraulic pressure fed from the shift control means and the pressure control means to first, second, third, fourth and fifth friction members. The pressure dispensing means includes a second-to-fourth/third-to-fourth speed shift valve, a second-to-third/fourth-to-third speed shift valve and a first-to-second speed shift valve, and the fifth friction member being applied by hydraulic pressure which is controlled by the N-R control valve. A first pressure line changing means selectively feeds reverse pressure and drive pressure each fed from the manual valve to the second pressure control valve. A switch valve selectively feeds hydraulic pressure fed from the second pressure control valve to the first and fourth friction members, the switch valve being controlled by reverse pressure fed from the manual valve. A second pressure line changing means selectively feeds hydraulic pressure fed from both of the first-to-second speed shift valve and the switch valve to the fourth friction member. A pressure damping means disposed on a line connected to the third friction member which is applied in third and fourth speeds of a drive "D" range. A first release pressure retarding means is disposed on a release pressure line of the fifth friction member and a second release pressure retarding means is disposed on a line connecting the first pressure control valve to the first-to-second speed shift valve.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

DETAILED DESCRIPTION OF THE PREFERRED EMBODIMENT

Figure 1:
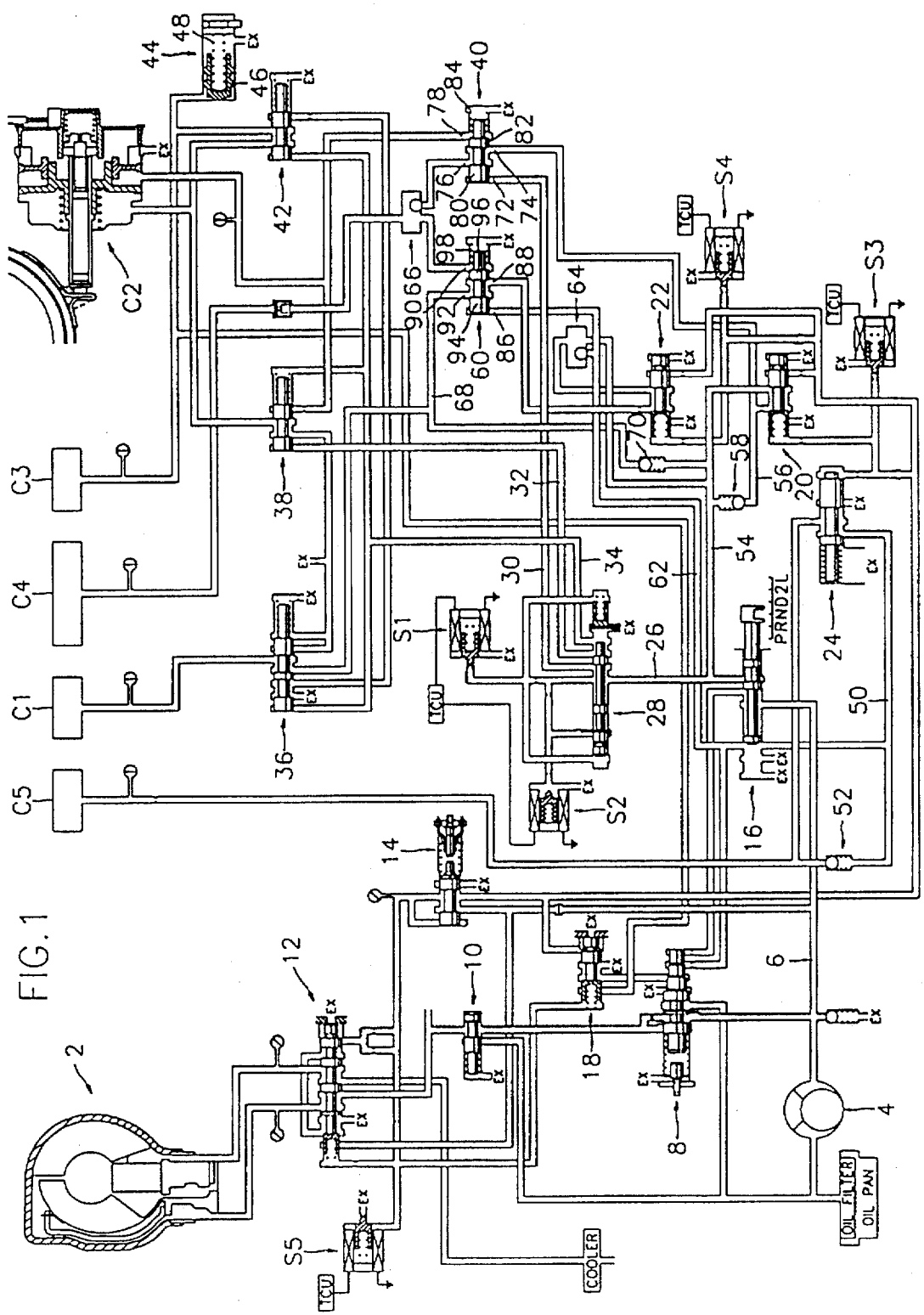
FIG. 1 depicts a hydraulic circuit diagram of a preferred embodiment of the hydraulic control system according to the present invention in the neutral "N" range of operation.

Reference will now be made in detail to the present preferred embodiment of the invention, an example of which is illustrated in the accompanying drawings. Wherever possible, the same reference numbers will be used throughout the drawings to refer to the same or like parts.

Certain terminology will be used in the following description for convenience and reference only and will not be limiting. The words "right" and "left" will designate directions in the drawings to which reference is made.

A preferred embodiment of the hydraulic control system according to the present invention is shown in FIG. 1. In FIG. 1, the hydraulic control system performs the shifting operation in accordance with an On/Off or duty operation of solenoid valves which are controlled by a transmission control unit (TCU) according to vehicle speed and throttle valve position.

That is, when the engine operates to drive a torque convertor 2, the input shaft of the transmission rotates to thereby drive a hydraulic pump 4, thereby generating hyraulic pressure.

Part of the hydraulic pressure is fed to a pressure regulating valve 8 to be regulated in a constant manner and is then fed to a torque converter control valve 10 and a damper clutch control valve 12. The rest of the hydraulic pressure is fed to a reducing valve 14 to thereby be reduced lower than line pressure and is then supplied to the damper clutch control valve 12, a high-low pressure valve 18, first and second pressure control valves 20 and 22, and an N-R control valve 24.

At this state, when the shift selector lever is set at the drive "D" range, a manual valve 16 interconnected with the shift selector lever feeds hydraulic pressure to a shift control valve 28 through a drive pressure line 26.

The shift control valve 28 supplies hydraulic pressure, in accordance with the operation of first and second shift control valves S1 and S2 which are controlled by the TCU, to a second-to-fourth/third-to-fourth speed shift valve 36, a second-to-third/fourth-to-third speed shift valve 38, a first-to-second speed shift valve 40, and an end clutch valve 42 through second, third and fourth lines 30, 32 and 34.

Further, each hydraulic pressure fed to the second-to-fourth/third-to-fourth shift valve 36, the second-to-third/fourth-to-third speed shift valve 38, the first-to-second speed shift valve 40, the end clutch valve 42 works together With hydraulic pressure fed from the first and second pressure control valves 20 and 22, which are controlled respectively by first and second pressure control solenoid valve S3 and S4, to selectively feed drive pressure proper to each speed ratio to first, second, third and fourth friction members C1, C2, C3 and C4, thereby accomplishing each shifting operation.

In addition, a fifth friction member C5 is designed to be supplied with hydraulic pressure controlled by the N-R control valve 24. An accumulator 44 is located on a line interconnecting the end clutch valve 42 and the third friction member C3 to control hydraulic pressure supplied to or exhausted from the third friction member C3.

The accumulator 44 includes a piston 46 biased by a spring 48 such that when hydraulic pressure fed to the third friction member C3 becomes higher than the elastic force of the spring 48, the piston 46 is retracted to receive hydraulic pressure, and when smaller than the elastic force of the spring 48, the piston 46 moves forward to exhaust hydraulic pressure.

A first check valve 52 comprised of a check ball and a spring is arranged on a hyraulic pressure release line 50 to retard the release of hydraulic pressure from the fifth friction member C5.

As a result, when hydraulic pressure fed to the fifth friction member C5 is released therefrom, the release of hyraulic pressure is retarded until the hydraulic pressure overcomes the spring force of the check valve 52 such that the feeling when shifting can be improved during manual range shifting.

Meanwhile, a line 54 for feeding drive pressure from the manual valve 16 to the first and second pressure control valves 20 and 22 and a line 56 connecting the first pressure control valve 20 with the first-to-second shift valve 40 are connected to each other by a connecting line. A second check valve 58 comprised of a check ball and a spring is arranged on the connecting line.

The second check valve 58 is designed to retard the release of hydraulic pressure from the friction members C2, C3 and C4 which receive hydraulic pressure dispensed through the first-to-second speed shift valve 40.

Also, control pressure of the second pressure control valve 22 is designed to be supplied to the second-to-fourth speed shift valve 36 or fourth friction member C4 in accordance with the port variation of a switch valve 60. The port variation of the switch valve 60 is accomplished by reverse pressure of the manual valve 16. That is, a reverse pressure line 62 is connected to a line for feeding drive pressure to the second pressure control valve 22 as well as the second pressure control valve 22 through a first shuttle valve 64.

On a line for feeding hydraulic pressure to the fourth friction member C4 through the switch valve 60, the second shuttle valve 66 in communication with the first-to-second speed shift valve 40 is disposed.

As a result, the fourth friction member C4 is designed to be selectively supplied with hydraulic pressure from the first-to-second speed shift valve 40 and the switch valve 60.

And, a line interconnecting a line 68 for feeding hydraulic pressure from the switch valve 60 to the second-to-fourth/third-to-fourth speed shift valve 36 and the line 54 for feeding hydraulic pressure from the manual valve 16 to the first and second pressure control valve 20 and 22 is provided with a third check valve 70 to control release pressure from the first friction member C1.

To accomplish such a connection, the first-to-second speed shift valve 40 is provided with a first port 72 connected with the second speed line 30, a second port 74 in communication with the first pressure control valve 20, a third port 76 for feeding hydraulic pressure to the second shuttle valve 66, and a fourth port 78 for feeding hydraulic pressure to the second to-third/fourth-to-third speed shift valve 38. The first-to-second speed shift valve 40 comprises a valve spool having a first land 80 for selectively communicating the second and third ports 74 and 76 with each other, a second land 82 for selectively communicating the second and fourth ports 74 and 78 with each other and a third land 82 biased by a spring 84.

The switch valve 60 is provided with a first port 86 connected to the reverse pressure line 62, a second port 88 communicating with second pressure control valve 22, a third port 90 for feeding hydraulic pressure to the second shuttle valve 66, and a fourth port 92 for feeding hydraulic pressure to the second-to-fourth/third-to-fourth speed shift valve 36. Switch valve 60 comprises a first land 94 for selectively communicating the second port 88 with the fourth port 92, a second land 96, which is biased by a spring 98, for selectively communicating the second and fourth ports 88 and 92 with each other.

Figure 2:
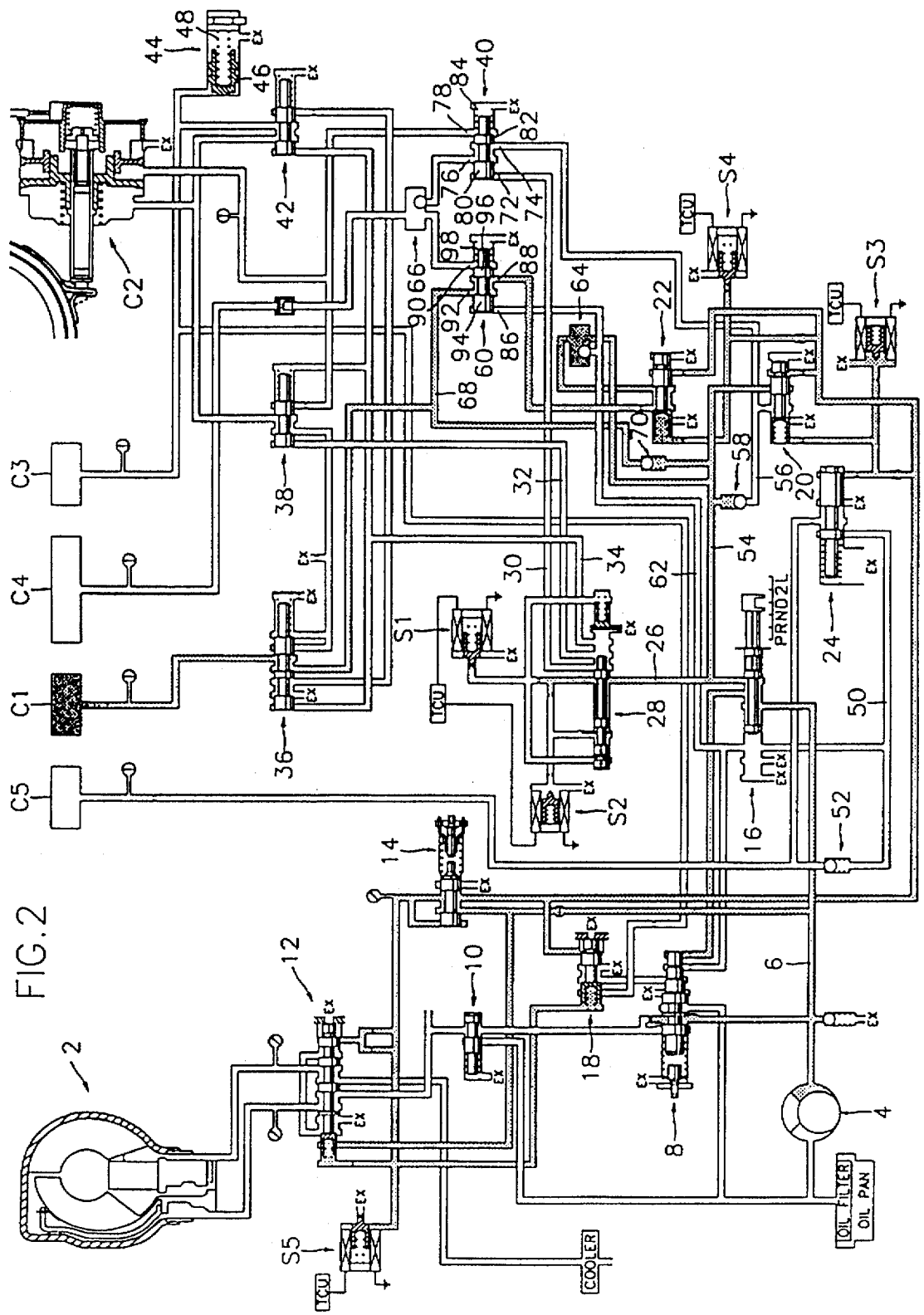
FIG. 2 depicts the hydraulic circuit diagram of FIG. 1 showing the operation of the control system during the first speed of a "D" range.

In the hydraulic control system as described above, as shown in FIG. 2 illustrating the operation of the hydraulic control system during the first speed of the "D" range, hydraulic pressure regulated in accordance with the shifting operation by the pressure regulating valve 8 is fed to the shift control valve 28 and the first and second pressure control valves 20 and 22 via the manual valve 16. At this point, since the first and second shift control solenoid valves S1 and S2 are controlled by the TCU to ON states, hydraulic pressure fed to the shift control valve 28 is exhausted.

Furthermore, since the first pressure control solenoid valve S3 is controlled to an ON state and the second pressure control solenoid valve S4 is controlled to an OFF state, hydraulic pressure which is to be fed to the first and second pressure control valves 20 and 22 is obstructed by means of the first pressure control valve 20 and is fed to the first friction member C1 through the second pressure control valve 22, the switch valve 60, and the second-to-fourth/third-to-fourth speed shift valve 36, thereby accomplishing the first speed ratio.

Figure 3:
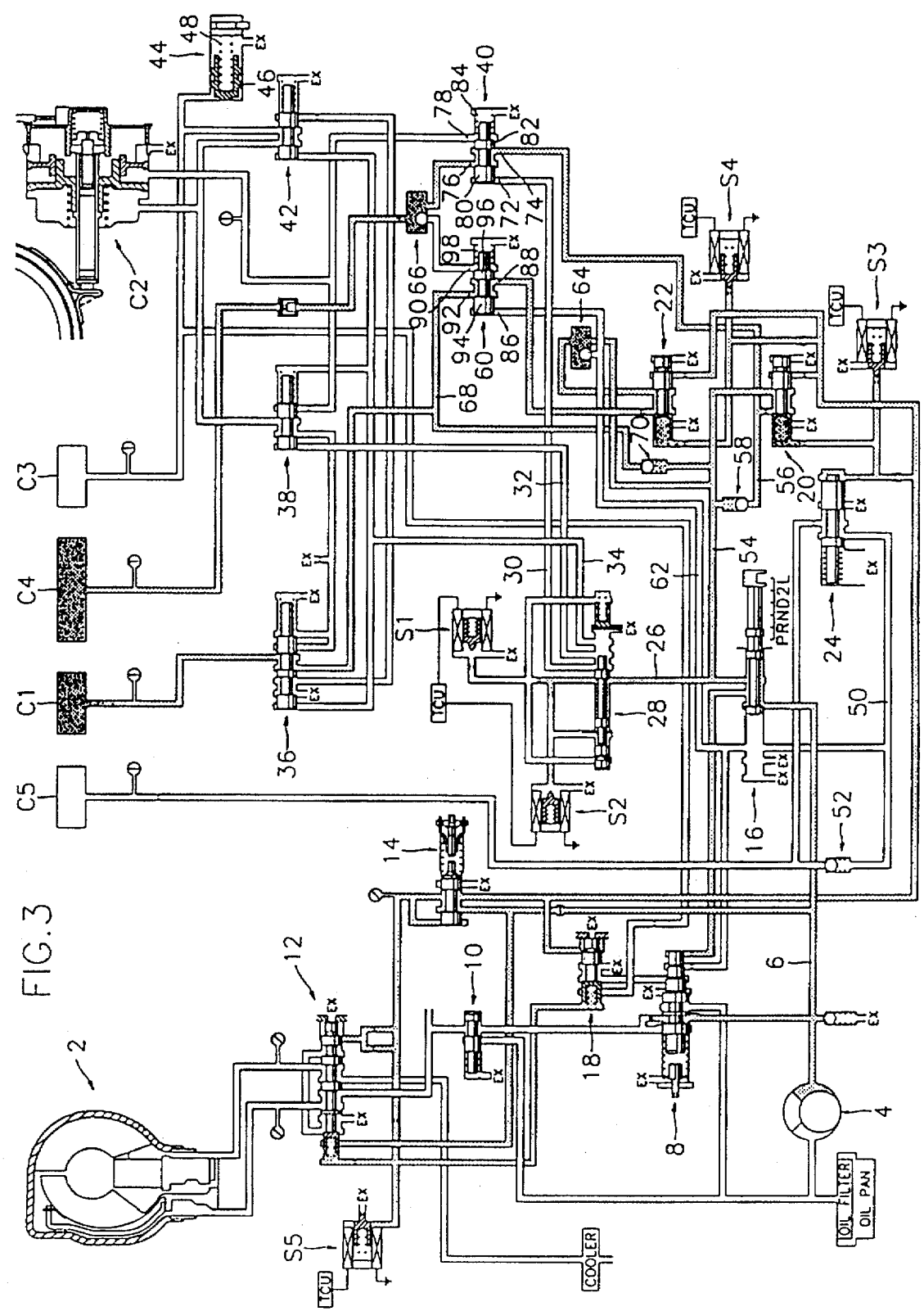
FIG. 3 depicts the hydraulic circuit diagram of FIG. 1 showing the operation of the control system during manual shifting from 25 the drive "D" range to the neutral "N" range.

FIG. 3 shows the location of hydraulic pressure at the low "L" range. At this range, the TCU controls both the first and second shift control solenoid valves S1 and S2 to ON states and controls both the first and second pressure control solenoid valves S3 and S4 to OFF states.

As a result, control pressure controlled by the first pressure control valve 20 is fed as apply pressure to the fourth friction member C4 through the first-to-second speed shift valve 40 and the second shuttle valve 66. Control pressure controlled by the second pressure control valve 22 is fed as apply pressure to the first friction member C1, thereby accomplishing the first speed ratio of the low "L" range.

Figure 4:
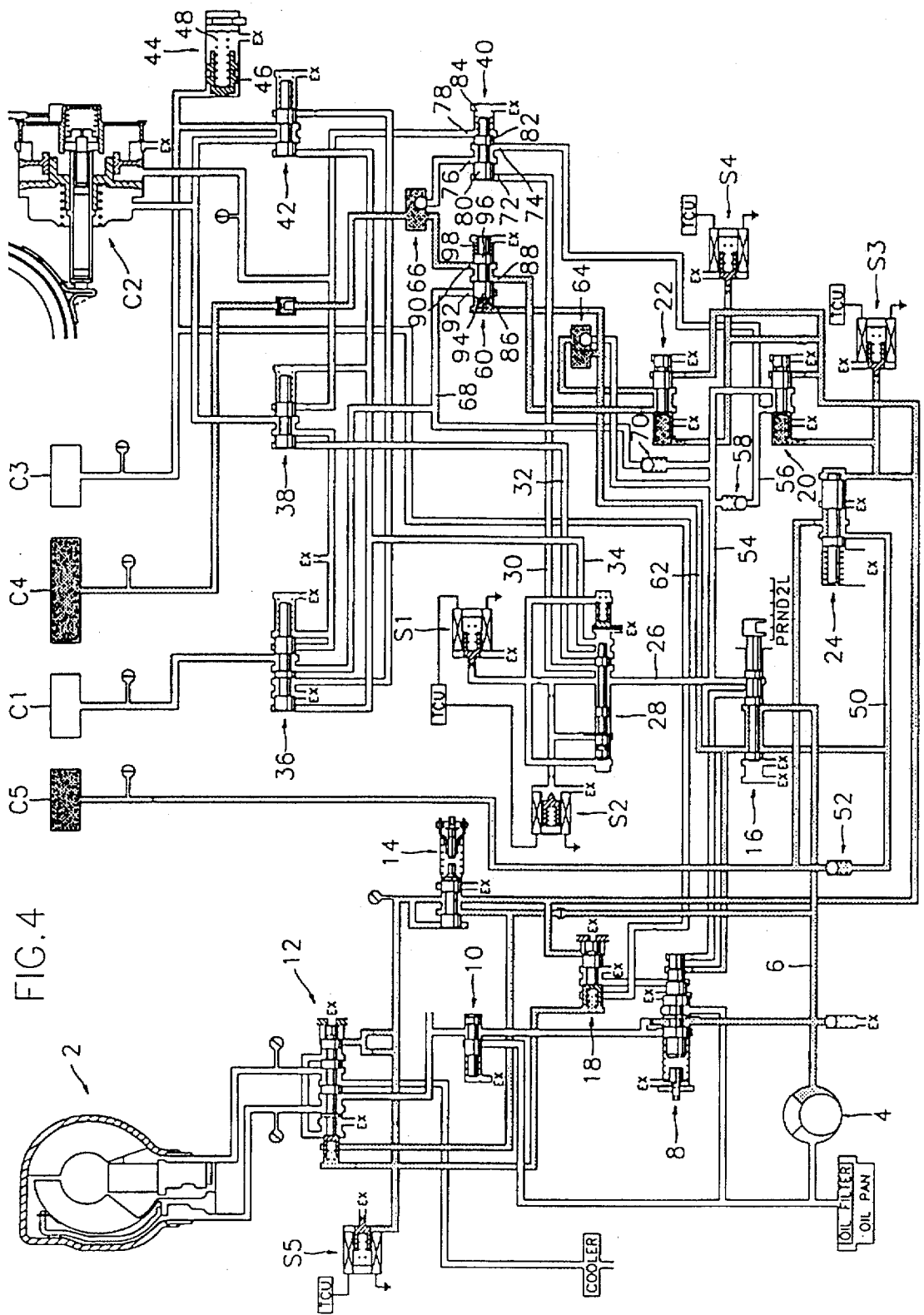
FIG. 4 depicts the hydraulic circuit diagram of FIG. 1 showing the operation of the control system during manual shifting from the neutral "N" range to the reverse "R" range.

FIG. 4 shows the location of hydraulic pressure during a manual shifting from the neutral "N" range to the reverse "R" range. When the shift selector lever is manually shifted to the reverse "R" range, the manual valve interconnected with the shift selector lever changes its ports such that part of hydraulic pressure generated from the hydraulic pump 4 is fed to the switch valve 60 through the reverse pressure line 62 to move its valve spool towards the right.

Further, part of hydraulic pressure is fed to the second pressure control valve 22 through the first shuttle valve 64, is then controlled by the second pressure control solenoid valve S4, and is supplied as apply pressure to the fourth friction member C4 through the switch valve 60 and the second shuttle valve 66. Additionally, the rest of the hydraulic pressure is fed as apply pressure to the fifth friction member C5 through the N-R control valve 24, thereby accomplishing the reverse mode.

At this point, since supply of the hydraulic pressure to the fifth friction member C5 is accomplished by control pressure of the N-R control valve 25 which is operated in accordance with the duty-control of the first pressure control solenoid valve S3, shift shock is alleviated during the manual range shifting from the neutral "N" range to the reverse "R" range.

That is, when manual range shifting to the reverse mode is performed, the fifth friction member C5 is applied after the fourth friction member C4 is applied.

Figure 5:
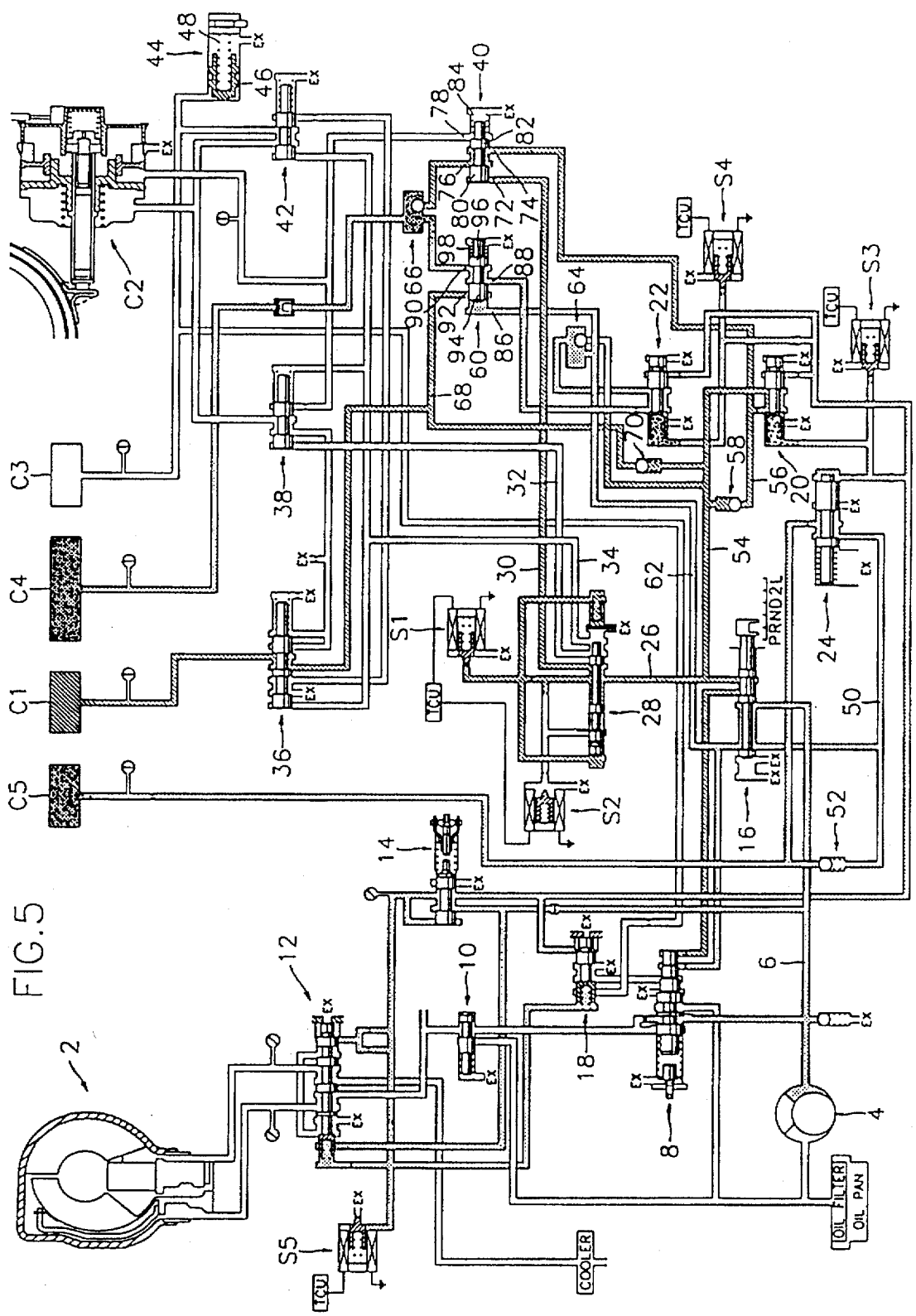
FIG. 5 depicts the hydraulic circuit diagram of FIG. 1 showing the operation of the control system during manual shifting from the drive "D" range to the reverse "R" range.

FIG. 5 shows the operation of the control system during manual range shifting from the second speed of the drive "D" range to the reverse "R" range. During this operation, hydraulic pressure, which has been fed to the first and second friction members C1 and C2 at the second speed of the drive "D" range, is exhausted through the manual valve 16. And hydraulic pressure is fed to the fourth and fifth friction members C4 and C5. At this point, the release of hydraulic pressure from the first friction member C1 is retarded by the third check valve 70 and the release of the hydraulic pressure from the second friction member C2 is retarded by the second check valve 58.

Further, hydraulic pressure fed to the fifth friction member C5 is controlled by the N-R control valve 24 such that shift shock can be alleviated.

In addition, during manual range shifting from the reverse "R" range to the drive "D" range, the fourth and fifth friction members C4 and C5 are released and the first and second friction members C1 and C2 are applied. At this point, the release pressure from the fourth friction member C4 is rapidly exhausted by the switch valve 60 and the first-to-second speed shift valve 40 and the release pressure from the fifth friction member C5 is retarded in its release speed by the first check valve 52.

Also, the first friction member C1, which is an input element, is directly applied by an OFF control of the second pressure control solenoid valve S4 and the second friction member C2 is controlled by a duty control of the first pressure control solenoid valve S4, thereby alleviating shift shock.

It will be apparent to those skilled in the art that various modifications and variations can be made in the hydraulic control system of the present invention and in construction of this system without departing from the scope or spirit of the invention.

Other embodiments of the invention will be apparent to those skilled in the art from consideration of the specification and practice of the invention disclosed herein. It is intended that the specification and examples be as exemplary only, with a true scope of the invention being indicated by the following claims.

What is claimed is:

1. A hydraulic control system for an automatic transmission, comprising:

a pressure regulating means, having a pressure regulating valve, for regulating hydraulic pressure fed from a hydraulic pump;

a shift control means, having a manual valve and a shift control valve, for feeding hydraulic pressure fed from the pressure regulating means in response to each shift mode;

a pressure control means for controlling hydraulic pressure for each shift mode, the pressure control means including first and second pressure control solenoid valves which are duty controlled by a transmission control unit, and first and second pressure control valves and an N-R control valve which are controlled in accordance with the operation of the solenoid valves;

a pressure dispensing means for dispensing hydraulic pressure from the shift control means and the pressure control means to first, second, third, fourth and fifth friction members, the pressure dispensing means including a second-to-fourth/third-to-fourth speed shift valve, a second-to-third/fourth-to-third speed shift valve and a first-to-second speed shift valve, and the fifth friction member being applied by hydraulic pressure which is controlled by the N-R control valve;

a first pressure line changing means for selectively feeding a reverse pressure and a drive pressure each fed from the manual valve, to the second pressure control valve;

a switch valve for selectively feeding hydraulic pressure from the second pressure control valve to the first and fourth friction members, the switch valve being controlled by reverse pressure fed from the manual valve;

a second pressure line changing means for selectively feeding hydraulic pressure from both the first-to-second speed shift valve and the switch valve to the fourth friction member;

a pressure damping means disposed in a line connected to the third friction member which is applied in third and fourth speeds of a drive "D" range;

a first release pressure retarding means disposed on a release pressure line of the fifth friction member; and a second release pressure retarding means disposed on a line connecting the first pressure control valve to the first-to-second speed shift valve.

2. The hydraulic control system of claim 1, wherein during manual range shifting from a neutral "N" range to a reverse "R" range, the fourth friction member which is a reacting element and the fifth friction member which is an input element are controlled such that an application of the fourth friction member is controlled after an application of the fifth friction member is controlled.

3. The hydraulic control system of claim 1, wherein the first and second pressure line changing means comprises respectively, first and second shuttle valves each having three ports.

4. The hydraulic control system of claim 3, wherein the switch valve is provided with a first port connected to a reverse pressure line, a second port connected to the second pressure control valve, a third port for feeding hydraulic pressure to the second shuttle valve, and a fourth port for feeding hydraulic pressure to the second-to-fourth/third-to-fourth speed shift valve, and includes a valve spool having a first land for selectively communicating the second port with the fourth port, a second land, which is biased by a spring, for selectively communicating the second and fourth ports and with each other.

5. The hydraulic control system of claim 3, wherein the first-to-second speed shift valve is provided with a first port in communication with the second speed line, a second port connected to the first pressure control valve, a third port for feeding hydraulic pressure to the second shuttle valve, and a fourth port for feeding hydraulic pressure to the second-to-third/fourth-to-third speed shift valve, and includes a valve spool having a first land for selectively communicating the second and third ports with each other, a second land for selectively communicating the second and fourth ports with each other, and a third land biased by a spring.

6. A hydraulic control system for an automatic transmission, comprising:

a pressure regulating means, having a pressure regulating valve, for regulating hydraulic pressure fed from a hydraulic pump;

a shift control means, having a manual valve and a shift control valve, for feeding hydraulic pressure fed from the pressure regulating means in response to each shift mode;

a pressure control means for controlling hydraulic pressure for each shift mode, the pressure control means including first and second pressure control solenoid valves which are duty controlled by a transmission control unit, and first and second pressure control valves and an N-R control valve which are controlled in accordance with the operation of the solenoid valves;

a pressure dispensing means for dispensing hydraulic pressure from the shift control means and the pressure control means to first, second, third, fourth and fifth friction members, the pressure dispensing means including a second-to-fourth/third-to-fourth speed shift valve, a second-to-third/fourth-to-third speed shift valve and a first-to-second speed shift valve, and the fifth friction member being applied by hydraulic pressure which is controlled by the N-R control valve;

a first pressure line changing means for selectively feeding a reverse pressure and a drive pressure, each fed from the manual valve, to the second pressure control valve;

a switch valve for selectively feeding hydraulic pressure from the second pressure control valve to the first and fourth friction members, the switch valve being controlled by reverse pressure fed from the manual valve;

a second pressure line changing means for selectively feeding hydraulic pressure from both the first-to-second speed shift valve and the switch valve to the fourth friction member; and a pressure damping means disposed in a line connected to the third friction member which is applied in third and fourth speeds of a drive "D" range.

7. A hydraulic control system for an automatic transmission, comprising:

a pressure regulating means, having a pressure regulating valve, for regulating hydraulic pressure fed from a hydraulic pump;

a shift control means, having a manual valve and a shift control valve, for feeding hydraulic pressure fed from the pressure regulating means in response to each shift mode;

a pressure control means for controlling hydraulic pressure for each shift mode, the pressure control means including first and second pressure control solenoid valves which are duty controlled by a transmission control unit, and first and second pressure control valves and an N-R control valve which are controlled in accordance with the operation of the solenoid valves;

a pressure dispensing means for dispensing hydraulic pressure from the shift control means and the pressure control means to first, second, third, fourth and fifth friction members, the pressure dispensing means including a second-to-fourth/third-to-fourth speed shift valve, a second-to-third/fourth-to-third speed shift valve and a first-to-second speed shift valve, and the fifth friction member being applied by hydraulic pressure which is controlled by the N-R control valve;

a first pressure line changing means for selectively feeding a reverse pressure and a drive pressure, each fed from the manual valve, to the second pressure control valve;

a switch valve for selectively feeding hydraulic pressure from the second pressure control valve to the first and fourth friction members, the switch valve being controlled by reverse pressure fed from the manual valve;

a second pressure line changing means for selectively feeding hydraulic pressure from both the first-tosecond speed shift valve and the switch valve to the fourth friction member; and a release pressure retarding means disposed on a release pressure line of the fifth friction member.

8. A hydraulic control system for an automatic transmission, comprising:

a pressure regulating means, having a pressure regulating valve, for regulating hydraulic pressure fed from a hydraulic pump;

a shift control means, having a manual valve and a shift control valve, for feeding hydraulic pressure fed from the pressure regulating means in response to each shift mode;

a pressure control means for controlling hydraulic pressure for each shift mode, the pressure control means including first and second pressure control solenoid valves which are duty controlled by a transmission control unit, and first and second pressure control valves and an N-R control valve which are controlled in accordance with the operation of the solenoid valves;

a pressure dispensing means for dispensing hydraulic pressure from the shift control means and the pressure control means to first, second, third, fourth and fifth friction members, the pressure dispensing means including a second-to-fourth/third-to-fourth speed shift valve, a second-to-third/fourth-to-third speed shift valve and a first-to-second speed shift valve, and the fifth friction member being applied by hydraulic pressure which is controlled by the N-R control valve;

a first pressure line changing means for selectively feeding a reverse pressure and a drive pressure, each fed from the manual valve, to the second pressure control valve;

a switch valve for selectively feeding hydraulic pressure from the second pressure control valve to the first and fourth friction members, the switch valve being controlled by reverse pressure fed from the manual valve;

a second pressure line changing means for selectively feeding hydraulic pressure from both the first-to-second speed shift valve and the switch valve to the fourth friction member; and a release pressure retarding means disposed on a line connecting the first pressure control valve to the first-to-second speed shift valve.

* * * * *

UNITED STATES PATENT AND TRADEMARK OFFICE
CERTIFICATE OF CORRECTION

PATENT NO.:      5,690,574

DATED:           November 25, 1997

INVENTOR):       Jaeduk Jang

It is certified that an error appears in the above-identified patent and that said Letters Patent is hereby corrected as shown below:

Claim 3, column 7, lines 35-36, "comprises respectively," should read
--comprises, respectively,--.

Signed and Sealed this

Third Day of March, 1998

Attest:

BRUCE LEHMAN

Attesting Officer                Commissioner of Patents and Trademarks